United States Patent Office 3,418,278
Patented Dec. 24, 1968

3,418,278
COPOLYMERS OF TRIOXANE WITH CYCLIC FORMAL AND PROCESS FOR PREPARING SAME
Gianfranco Pregaglia, Milan, Paolo Roffia, Mantova, and Giancarlo Pozzi, Milan, Italy, assignors to Montecatini Edison S.p.A., Milan, Italy, a corporation of Italy
No Drawing. Filed Apr. 6, 1966, Ser. No. 540,530
Claims priority, application Italy, Apr. 7, 1965, 7,661/65
15 Claims. (Cl. 260—64)

ABSTRACT OF THE DISCLOSURE

Thermally stable copolymers of trioxane and cyclic formals containing besides —OCH$_2$O— units, oxyalkylene units derived from opening of one or both acetalic groups comprised in the cyclic formal molecule are obtained by copolymerizing the mixed monomers in contact with Lewis acids containing fluorine or chlorine atoms. Terpolymers are contemplated.

---

The present invention relates to new copolymers showing high thermal stability, and more particularly to copolymers consisting mainly of recurring —CH$_2$O— units.

As is known, polyoxymethylene polymers are obtained by polymerizing anhydrous formaldehyde or trioxane, which is formaldehyde's cyclic trimer. It is also known that the copolymers containing along the chain, monomer units different from —CH$_2$O— can be obtained. These products are obtained by copolymerizing trioxane with particular monomers, such as cyclic anhydrides or epoxides. In this last case (with epoxides), polyoxymethylene polymers contain enchained —O—CH$_2$—CH$_2$— units and are characterized by a substantially higher thermal stability than polyoxymethylene homopolymers.

The object of the present invention is the preparation of polyoxymethylene copolymers containing oxyalkylene units derived from the opening of cyclic acetals. Said monomer units can be added to the growing polyoxymethylene chain both by opening of only one acetalic group, and by opening of both groups contained in the molecule. In the first case a completely linear and thermally stable polymer can be obtained which is, however, capable of cross-linking by opening of the residual acetalic group. In the second case a partially cross-linked polymer is obtained while polymerizing and possesses physical and chemical characteristics dependent on the comonomer content and on the cross-linking degree.

According to the present invention, these polyoxymethylene copolymers are prepared by reacting trioxane with cyclic formals.

The cyclic formals are derived from cyclic ketones, such as cyclo-hexanone and cyclo-pentanone wherein all hydrogens in $\alpha$ and $\alpha'$ are substituted by methylol groups condensed with formaldehyde and form a structure of cyclic formal (see Mannich, Brose—Chem. Ber. 56, 840 (1923)):

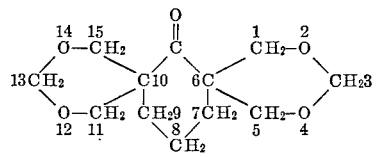

(I) 2,4,12,14-tetraoxadispiro[5,3,5,1]-hexadecane-16-one

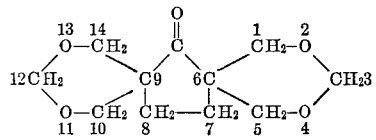

(II) 2,4,11,13-tetraoxa-dispiro[5,2,5,1]-pentadecane-15-one

Under the polymerization conditions, one or both acetalic groups present in the molecule split off at random and are added to the growing polyoxymethylene chains, bringing about chains of Type III, and Type IV, respectively.

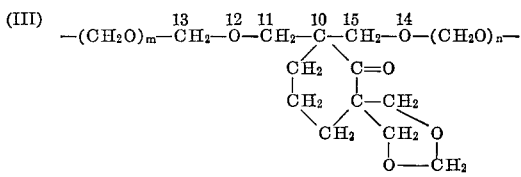

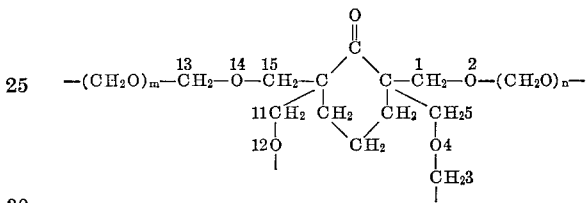

wherein $m$ and $n$ are whole numbers between 1 and 1000.

The presence of said monomer units allows appreciable enhancement of thermal stability and modification, within wide limits, of the mechanical physical and chemical properties of these polyoxymethylene polymers.

The catalyst used for the preparation of the above copolymers are the ones known in the art for the polymerization of trioxane. Suitable catalysts are Lewis acids, containing fluorine or chlorine atoms, such as antimony fluoride, antimony fluoroborate, phosphorus pentachloride, ferric chloride, and the like. However, the preferred copolymerization catalysts are BF$_3$ alone; or complexed with organic compounds in which oxygen or sulphur is the electron-donor atom, such as BF$_3 \cdot$(C$_2$H$_5$)$_2$O and BF$_3 \cdot$(CH$_3$)$_2$S; FeCl$_3$ and SnCl$_4$.

The catalyst is used in amounts ranging from 0.0001 to 0.1% based on the weight of trioxane, preferably between 0.001 and 0.01%.

The trioxane employed must be anhydrous or substantially anhydrous.

The copolymerization may be carried out either in the absence of solvent or one can also operate in a hydrocarbon solution such as benzene or cyclohexane, chloroalkane solutions such as methylene chloride, nitroarene solutions such as nitrobenzene.

The reaction temperature ranges from 30° to 120° C., preferably from 50° to 90° C.

The copolymers produced according to the present invention are substantially made up of oxymethylene sequences interrupted by oxyalkylene units at a ratio of from 6:1 up to 1000:1. They have a softening point comprised between 150° and 175° C. and a melting point between 175° and about 200° C. When treated with boiling dimethylformamide the copolymers swell but do not dissolve in large amounts.

In addition to the formation of binary copolymers of trioxane and the compounds with Formulas I and II, terpolymers may be obtained according to the present invention with the same reaction conditions, by using a mixture of trioxane and both Compounds I and II or a mixture of trioxane, one of said Compound I or II and a third monomer selected from the group consisting of dioxolane, ethylene oxide, 2,4-dimethyl dioxolane, 4-methyl-metadioxane, hexahydrobenzo-trioxyepane, and hexahydrobenzodioxolane.

The comonomers of Formula I or II and the third comonomer if any are added to trioxane in a mol ratio comprised between 1:2 and 1:333.

The use of the latter type of third comonomer permits to reduce the degree of crosslinking by lowering the amount of the comonomer I or II in the mix without causing a decrease of the thermal stability of the polymer that is obtained. The terpolymers are in general more soluble in boiling dimethylformamide than the corresponding copolymers of trioxane with either Compound I or Compound II.

The following examples illustrate our invention without limiting its scope.

EXAMPLE 1

149 g. trioxane, which was rendered anhydrous by heating at its boiling point over a sodium-potassium alloy, are distilled under nitrogen and condensed into a 250 cm.$^3$ three-neck flask provided with side cock and stirrer. At the end of distillation, 8 g. of the formal of Formula I are added and the mass is heated at 70° C. under agitation until a homogeneous solution is reached. By means of a hypodermic syringe, piercing the rubber tap covering one of the flask necks, 1 cc. of an 0.07 M solution of $BF_3 \cdot (C_2H_5)_2O$, in nitrobenzene is added.

The polymerization starts very soon after this addition and rapidly leads to formation of a compact block of polymer. The polymerization is then stopped by adding an excess of methanol.

The polymer is reduced to a finely divided powder, is washed with a hot ammonia solution, and then with acetone. After drying with a mechanical pump, 138 g. of polymer are weighed. A sample of the copolymer treated with boiling dimethylformamide swells, but does not dissolve. When it is heated in a capillary tube, the copolymer begins softening at 175° C., and melts between 190° C. and 200° C. The poor solubility and the high melting point are an indication of cross-linking.

A sample, containing 0.5% N-phenyl-beta-naphthylamine, is heated under vacuum at 180° C. for 2 hours in order to remove the unstable fraction. The weight loss of the residue, measured at 225° C., is not higher than 0.2% per minute.

EXAMPLE 2

120 g. trioxane are introduced under nitrogen into a 250 cc. three-neck flask, provided with a side cock and a stirrer. Then 2.8 cc. dioxolane and 5 g. of formal of Formula I are added and the mass is heated at 70° C. under agitation until a homogeneous solution is obtained. Then 1 cc. of an 0.07 M solution of $BF_3(C_2H_5)_2O$, in nitrobenzene, is added.

The polymerization starts immediately and rapidly leads to the formation of a compact and hard mass of polymer. After half an hour an excess of methanol is added. The polymer is recovered, and milled to a finely divider powder. It is then washed with hot ammonia solution and then with acetone.

After drying with a mechanical pump, 110 g. polymer are weighed. When it is heated in a capillary tube, the copolymer begins softening at 168° C. and melts at about 180° C. A sample, containing 0.5% N-phenyl-beta-naphthylamine, is heated under vacuum at 180° C. for 2 hours in order to remove the unstable fraction, amounting to 4%. The weight loss of the residue measured at 225° C., on a thermo-balance is not higher than 0.03% by weight per minute.

Its inherent viscosity in dimethylformamide at 150° C. is 0.82.

The melt index was determined by heating a sample of the polymer in a standard cylinder, ASTM 1238, at 200° C. It was then extruded under a load of respectively, 2.16 kg. and 10 kg., through an orifice of 2 mm. diameter and 0.75 mm. height, and by weighing the polymer coming out within a given time.

The result, expressed as grams extruded within 10 minutes, is the melt index. With loads of 2.16 kg., we obtained: 0.48 g./10 minutes; with loads of 10 kg., we obtained: 7 g./10 minutes.

The melt index determined on a trioxane-dioxolane copolymer having an inherent viscosity of 0.84 gave the following results: With loads of 2.16 kg. we obtained: 2.35 g./10 minutes; with loads of 10 kg. we obtained: 20.5 g./10 minutes.

A comparison of the melt indexes of the copolymer and the terpolymer shows that the terpolymer is partially cross-linked. However, the degree of cross-linking in the terpolymer is small, since the terpolymer is thermoplastic, soluble in the usual solvents for oxymethylene polymers, and can be processed using the usual molding and extrusion techniques for oxymethylene polymers.

EXAMPLE 3

It is operated as in Example 1 except that in place of 8 g. of the formal of Formula I are used 9 g. of the formal of Formula II. 142 g. of polymer are obtained having a softening point of about 171° C. and a melting point of about 195° C. The solubility in boiling dimethylformamide and the thermal stability of this copolymer are the same as those of the copolymer of Example 1.

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

We claim:

1. High molecular weight polyoxymethylene copolymers consisting essentially of oxymethylene sequences separated by units derived from the opening of a cyclic formal selected from the group consisting of 2,4,12,14-tetraoxa-dispiro[5,3,5,1]hexadecane-16-one and 2,4,11,13-tetraoxa-dispiro[5,2,5,1]pentadecane-15-one, and having a chain repeating structure selected from the group consisting of

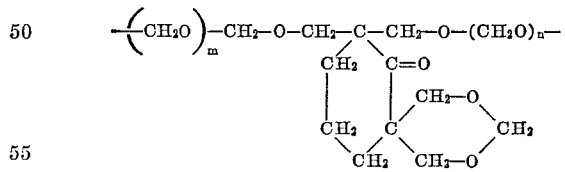

and

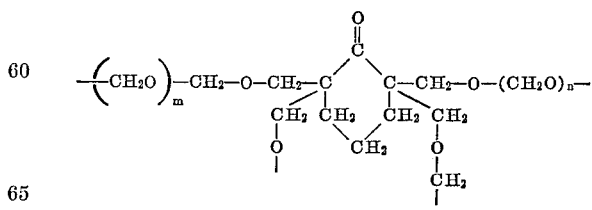

wherein $m$ and $n$ are whole numbers between 1 and 1000.

2. Copolymers according to claim 1 in which the ratio of oxymethylene sequences to units derived from cyclic formal is from 6:1 to 1000:1.

3. Copolymers consisting essentially of the oxymethylene and cyclic formal units of claim 1 having a melting point between 175° and 200° C. and which are insoluble in boiling dimethylformamide.

4. Copolymers according to claim 1, in which the oxymethylene sequences are separated by units derived from the opening of both above defined cyclic formals.

5. Copolymers according to claim 1 which contain in addition to monomers of claim 1, a monomer selected from the group consisting of dioxolane, ethylene oxide, 2,4 dimethyl dioxolane, 4-methyl-metadioxane, hexahydrobenzotrioxyepane, and hexahydrobenzodioxolane.

6. Copolymers according to claim 1 which are cross-linked.

7. Terpolymers according to claim 5 which have only a relatively small degree of cross-linking.

8. Polyoxymethylene copolymers consisting of oxymethylene sequences separated by units selected from the group having the formula

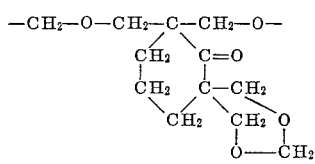

and

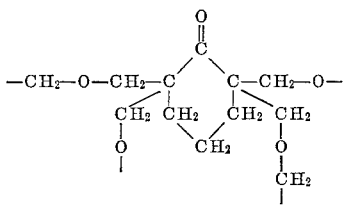

wherein the ratio between oxymethylene units and said comonomer units is comprised between 6:1 and 1000:1.

9. Polyoxymethylene copolymers consisting of oxymethylene sequences separated by units selected from the group having the formula

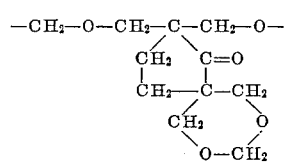

and

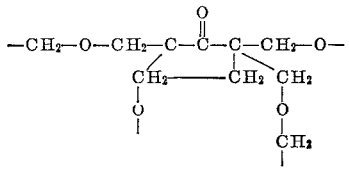

wherein the ratio between oxymethylene units and said comonomer units are comprised between 6:1 and 1000:1.

10. Polyoxymethylene copolymers according to claim 8 which also contain units derived from a monomer selected from the group consisting of dioxolane, ethylene oxide, 2,4 dimethyl dioxolane, 4-methyl-metadioxane, hexahydrobenzo-trioxyepane, and hexahydrobenzodioxolane.

11. Polyoxymethylene copolymers according to claim 9 which also contain units derived from a monomer selected from the group consisting of dioxolane, ethylene oxide, 2,4 dimethyl dioxolane, 4-methyl-metadioxane, hexahydrobenzo-trioxyepane, and hexahydrobenzodioxolane.

12. A process for obtaining polyoxymethylene copolymers containing oxymethylene sequences separated by units derived from the opening of a cyclic formal characterized in that trioxane is reacted with a cyclic formal, selected from the group consisting of 2,4,12,14-tetraoxadispiro[5,3,5,1]hexadecane-16-one and 2,4,11,13-tetraoxadispiro[5,2,5,1]pentadecane-15-one, in the presence of a catalyst of the Lewis acid type, containing a halogen selected from the group consisting of chlorine and fluorine, at a temperature between 30° and 120° C.

13. Process according to claim 12 in which the temperature is between 50° and 90° C.

14. A process according to claim 12, characterized in that the catalyst used is selected from the group consisting of $BF_3 \cdot (C_2H_5)_2O$, $BF_3 \cdot (CH_3)_2S$, $FeCl_3$ and $SnCl_4$.

15. A process according to claim 12, characterized in that a catalyst amount ranging from 0.001 and 0.01% by weight of trioxane, is employed.

References Cited

UNITED STATES PATENTS

| | | | |
|---|---|---|---|
| 3,256,246 | 6/1966 | Gutweiler et al. | 260—67 |
| 3,293,218 | 12/1966 | Sidi | 260—67 |
| 3,346,663 | 10/1967 | Kern et al. | 260—823 |

WILLIAM H. SHORT, *Primary Examiner.*

L. M. PHYNES, *Assistant Examiner.*

U.S. Cl. X.R.

260—45.9, 67